United States Patent [19]

Nemoto

[11] Patent Number: 4,651,586
[45] Date of Patent: Mar. 24, 1987

[54] POWER TRANSMISSION MECHANISMS

[76] Inventor: Isao Nemoto, 11-24 Higashi-Narashino 6-chome, Narashino City, Chiba Prefecture, Japan

[21] Appl. No.: 785,447

[22] Filed: Oct. 8, 1985

Related U.S. Application Data

[63] Continuation-in-part of Ser. No. 471,352, Mar. 2, 1983, abandoned.

[30] Foreign Application Priority Data

Mar. 3, 1982 [JP] Japan .................................. 57-32326

[51] Int. Cl.⁴ .......................... F16H 1/16; F16H 55/22
[52] U.S. Cl. ...................................... 74/425; 74/458; 74/465
[58] Field of Search ................ 74/425, 427, 458, 464, 74/465, 89.14, 457

[56] References Cited

U.S. PATENT DOCUMENTS

| | | | |
|---|---|---|---|
| 908,049 | 12/1908 | Teal | 74/464 |
| 1,007,584 | 10/1911 | Lord | 74/464 |
| 1,273,533 | 7/1918 | Pfahler | 74/464 |
| 1,297,238 | 3/1919 | Pfahler | 74/464 |
| 1,470,718 | 10/1923 | Forsyth | 74/464 |
| 1,580,055 | 4/1926 | Lay | 74/464 |
| 1,844,005 | 2/1932 | Chandler | 74/464 |
| 2,597,389 | 5/1952 | Setter | 74/464 |
| 2,714,315 | 8/1955 | Reader et al. | 74/465 |
| 3,495,470 | 2/1970 | McCartin | 74/415 |
| 3,597,990 | 5/1970 | McCartin | 74/415 |
| 3,608,392 | 9/1971 | Gilbert | 74/464 |
| 3,820,413 | 6/1974 | Brackett | 74/415 |
| 4,008,625 | 2/1977 | Malhotra | 74/441 |

FOREIGN PATENT DOCUMENTS

| | | | |
|---|---|---|---|
| 2115902 | 9/1983 | United Kingdom | 74/465 |
| 0670758 | 6/1979 | U.S.S.R. | 74/427 |

Primary Examiner—Allan D. Herrmann
Attorney, Agent, or Firm—Bierman & Muserlian

[57] ABSTRACT

A power transmission mechanism having an hourglass worm with a continuous tooth groove. Cooperating with the hourglass worm is a wheel device having a plurality of recesses therein spaced around its circumference with the spacing between the recesses corresponding to a pitch of the continuous tooth groove. A roller is mounted in each of the recesses for rotation in a transverse direction with respect to the circumference of the wheel device and is in meshing engagement with the continuous groove. Each roller is formed from a pair of disc rollers.

1 Claim, 4 Drawing Figures 4,651,586

POWER TRANSMISSION MECHANISMS

PRIOR APPLICATION

This application is a continuation-in-part of copending U.S. patent application Ser. No. 471,352 filed Mar. 2, 1983, now abandoned.

BACKGROUND OF THE INVENTION

This invention relates to a power transmission mechanism and, more particularly to an improved power transmission mechanism of the kind comprising an hourglass worm and a worm wheel.

In the case of worm gearing consisting of an hourglass worm and a worm wheel, a large number of teeth on the worm wheel are meshed with a continuous helical tooth formed on the hourglass worm and the area supporting the pressure between the teeth of the worm wheel and the tooth of the worm is greater than in the case of the more usual worm gearing with a cylindrical worm, and it has, therefore, advantages that the wear of the teeth is reduced and large forces can be transmitted with a comparatively small driving force.

However, this kind of the worm gearing has a disadvantage in that when the worm is moved slightly in a direction which is at right angles to the longitudinal axis of the worm something goes wrong with the engagement of the hourglass worm and worm wheel.

To improve conventional power transmission mechanisms including an hourglass worm, the inventor of the present invention has already proposed that a power transmission mechanism comprising an hourglass worm, a wheel device having a plurality of recesses therein spaced around the circumference thereof, the spacing between the recesses corresponding to the pitch of a continuous tooth groove in the hourglass worm, and ball or roller means mounted in meshing engagement with the groove and each ball or roller means being rotated at least about an axis which extends substantially in the direction of rotation of the wheel device.

According to the above, the wheel device comprises a pair of disks so that the ball or roller means can easily be mounted on the wheel device. Each of the disks is provided with a number of slots on the circumference of the disks at equal distance with the pitch of the tooth groove in the worm. This, however, has the disadvantage that it is difficult to manufacture.

In the above proposed power transmission mechanism, each slot is formed to incline at a desired lead angle with respect to a plane parallel to the surface of the disc and a ball bearing unit is mounted in each slot. This requires an extremely precise process.

OBJECTS OF THE INVENTION

In the light of the above, it is a principal object of the present invention to provide a novel power transmission mechanism having none of the disadvantages of conventional worm gearing and a prior hourglass worm gearing.

It is a further object of the present invention provides a power transmission mechanism in which the the wheel device can be constructed by one disc member.

It is another object of the present invention to provide a power transmission mechanism in which a device for meshing with an hourglass worm is easily mounted in a wheel device.

It is a still further object of the present invention to provide a power transmission mechanism in which means for meshing with the continuous groove of the worm is constructed by a number of rollers so that the mechanism can operate smoothly between the contact portions is minimized.

BRIEF DESCRIPTION OF THE DRAWINGS

The invention will be more particularly described with reference to the accompanying drawings, in which.

DETAILED DESCRIPTION OF PREFERRED EMBODIMENT

Figure 1:
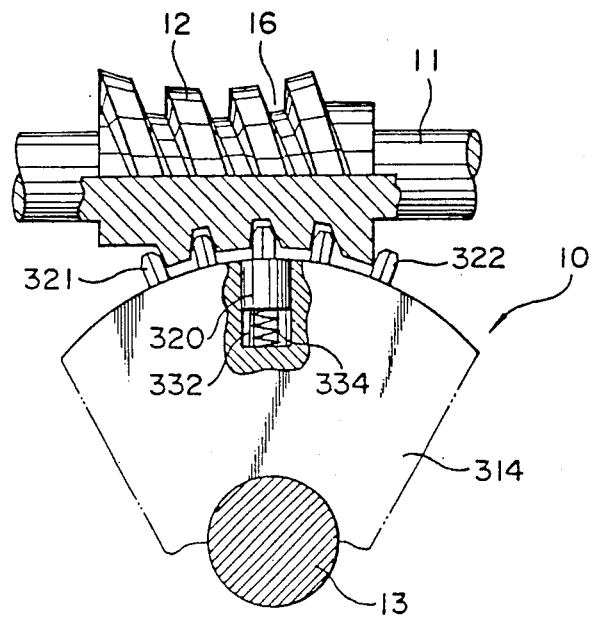
FIG. 1 is a schematic view, partly broken away to show the interior construction, of a preferable embodiment of the power transmission mechanism according to the present invention.

Referring now to the drawings, a power transmission mechanism 10 comprises an hourglass worm 12 fixed to a driving shaft 11 and a wheel device 314 to be driven by the hourglass worm 12, the wheel device 314 being fixed to a driving shaft 13 which is spaced from the driving shaft 11 and extending in a direction perpendicularly intersecting the driving shaft 11.

A number of roller devices 320 are mounted around the circumference of a wheel device 314, at a spacing from one another corresponding to the pitch of the groove 16 in the worm 12.

Figure 2:
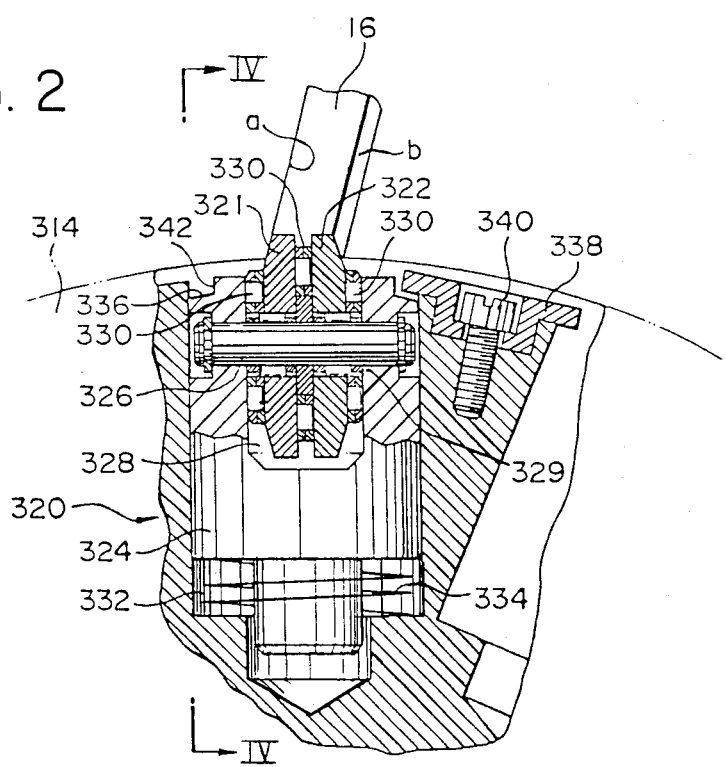
FIG. 2 is an enlarged partial cross section illustrating the principal portion of the power transmitting mechanism of FIG. 1.
Figure 3:
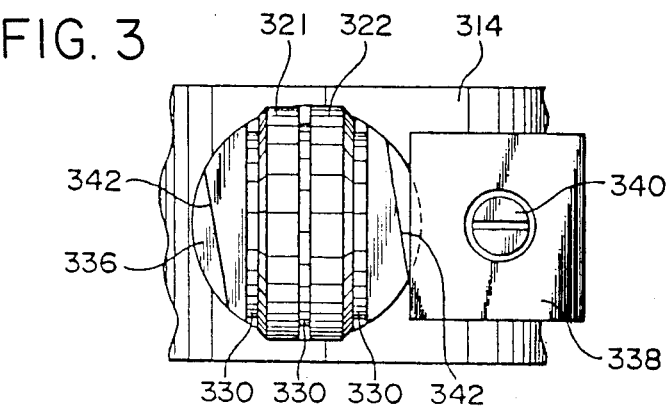
FIG. 3 is a top plan view of FIG. 2.
Figure 4:
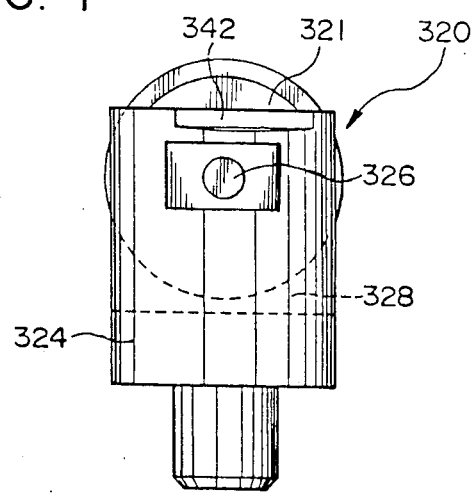
FIG. 4 is an elevation shown in the direction of the arrows substantially along the line XVII—XVII of FIG. 2.

As shown in FIGS. 2 to 4, the roller device 320 consists of a plurality of disk rollers 321, 322 and a cylindrical support member 324 for mounting the rollers. Although two disk rollers 321 and 322 are shown in the drawings, the number of the disk roller may be varied if desired. The shape or dimension of the roller may be determined to mesh with the groove 16 in the hourglass worm 12. These roller 321 and 322 are respectively mounted by means of a pin or shaft 326 so as to rotate about the shaft 326 in a slot 328 which is formed in the cylindrical support member 324.

Suitable bearing means 329 or 330 are arranged between the roller disks 321 and 322 and between the side wall of the slot 328 and the disk rollers 321 and 322. These bearing means 328 and 329 and the mechanism consisting the hourglass worm and the wheel device may be housed in a casing filled with oil, if desired.

A number of cylindrical recesses 332 are formed in the outer periphery of the wheel device 314 for mounting the cylindrical support members 324 and an elastic member such as, for example, a coil spring or disk spring 334 may be placed between each support member 324 and the bottom of its recess 332 for urging the rollers 321 and 322 mounted on the supporting member 324 to engage the disk rollers 321 and 322 with the groove 16 in the hourglass worm 12. If desired, pneumatic or hydraulic means may be used for applying the pressure to the supporting member 324 as a substitute for the elastic member.

In order to prevent the supporting member 324 from sliding out of the recesses 332, a holder 338 is arranged between adjacent pairs of the support members 324 and 324 as shown in FIG. 3. The holder 338 engages a shoulder 336 of each support member 324 and is fixed by a suitable means such as a screw 340 to the wheel device 314.

If desired, the rotation of the support member 324 about its longitudinal axis in the cylindrical recess 332 may be limited by the cooperation of the holder 338 and a shoulder portion 342 formed on each support member 324.

According to the power transmission mechanism of the present invention, the rollers 321 and 322 respectively contact side walls (a) and (b) of the groove 16 in the hourglass worm 12. In the case where the distance between the side walls (a) and (b) of the groove 16 is long, that is, the width of the groove 16 is wide, the difference in the peripheral velocity of the side walls (a) and (b) of the groove 16 is compensated by the rollers 321 and 322.

As each cylindrical support member 324 is able to rotate about its longitudinal axis in its cylindrical recess 332, the rollers 321 and 322 can adjust to the helical tooth groove 16 in the hourglass worm 12 independent of the lead angle of the groove 16.

While the invention has been described in its preferred embodiments, it is to be understood by those skilled in the art that the foregoing and other changes in form and details can be made herein without departing from the spirit and scope of the invention.

What is claimed is:

1. A power transmission mechanism comprising an hourglass worm, a wheel device having a plurality of recesses therein spaced around the circumference thereof, the spacing between said recesses corresponding to a pitch of a continuous tooth groove in said hourglass worm and roller means mounted in each of said recesses for rotation in a transverse direction with respect to the circumference of said wheel device in meshing engagement with said groove, said roller means being formed from a pair of disc rollers.

* * * * *